(12) United States Patent
Nakamura

(10) Patent No.: US 7,641,164 B2
(45) Date of Patent: *Jan. 5, 2010

(54) POWER SEAT SLIDE APPARATUS FOR VEHICLE

(75) Inventor: Yoshitaka Nakamura, Toyota (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 28 days.

This patent is subject to a terminal disclaimer.

(21) Appl. No.: 11/402,797

(22) Filed: Apr. 13, 2006

(65) Prior Publication Data

US 2006/0237619 A1  Oct. 26, 2006

(30) Foreign Application Priority Data

Apr. 22, 2005  (JP) .............................. 2005-125660

(51) Int. Cl.
*F16M 13/00* (2006.01)
(52) U.S. Cl. .................. 248/424; 248/422; 297/344.17
(58) Field of Classification Search ................. 248/419, 248/422, 424, 429; 297/311, 312, 344.1, 297/344.17; 296/65.01, 65.11, 65.13, 65.14, 296/65.15; 403/331; 74/89.23
See application file for complete search history.

(56) References Cited

U.S. PATENT DOCUMENTS

| | | | | |
|---|---|---|---|---|
| 5,348,262 | A * | 9/1994 | Isomura ...................... | 248/430 |
| 6,220,642 | B1 * | 4/2001 | Ito et al. .................. | 296/65.14 |
| 6,250,170 | B1 * | 6/2001 | Hill et al. .................... | 74/89.23 |
| 6,688,667 | B2 * | 2/2004 | Nishimoto et al. ....... | 296/65.15 |
| 7,303,223 | B2 * | 12/2007 | Nakamura et al. ........ | 296/65.15 |

FOREIGN PATENT DOCUMENTS

| | | |
|---|---|---|
| JP | 01-162829 U | 11/1989 |
| JP | 02-087625 U | 7/1990 |
| JP | 11-334424 A | 12/1999 |
| JP | 2001-239861 | 9/2001 |
| JP | 2002-192996 | 7/2002 |
| JP | 2005-096522 A | 4/2005 |

OTHER PUBLICATIONS

Chinese Official Action.
French Search Report issued on Aug. 12, 2009 in a corresponding French Patent Application No. FR 0603585.
Japanese Office Action issued Aug. 25, 2009 in a corresponding Japanese Patent Application No. 2005-125660, and partial English translation.

* cited by examiner

*Primary Examiner*—A. Joseph Wujciak, III
(74) *Attorney, Agent, or Firm*—Buchanan Ingersoll & Rooney PC

(57) ABSTRACT

A power seat slide apparatus for a vehicle includes a first rail adapted to be fixed to a vehicle floor, a second rail adapted to be fixed to a vehicle seat and slidably supported relative to the first rail, a screw shaft screwed to a nut member which is fixed to the first rail, the screw shaft including an end portion and a stepped portion, a washer engaged with the stepped portion of the screw shaft, a gear member to which the end portion of the screw shaft is inserted, a fastening member provided at the end portion of the screw shaft, and a gear box fixed to an end of the second rail. The gear box includes a support bracket, a gear housing, and a plate. The stepped portion of the screw shaft is arranged in such a manner that the washer is connected thereto in the gear housing.

3 Claims, 5 Drawing Sheets

POWER SEAT SLIDE APPARATUS FOR VEHICLE

This application is based on and claims priority under 35 U.S.C. § 119 to Japanese Patent Application 2005-125660, filed on Apr. 22, 2005, the entire content of which is incorporated herein by reference.

FIELD OF THE INVENTION

The present invention relates to a power seat slide apparatus for a vehicle.

BACKGROUND

JP2001-239861A and JP2002-192996A respectively disclose a power seat slide apparatus for a vehicle, which adjusts a position of a vehicle seat by sliding an upper rail relative to a lower rail by means of a driving force of an electrical drive source. As illustrated in FIGS. 4A-4B, each disclosed power seat slide apparatus for the vehicle includes a lower rail 81, an upper rail 82, a nut member 83, a screw shaft 84, and a gear box 85. The lower rail 81 is fixed to a vehicle floor, the upper rail 82 is slidably supported by the lower rail 81 and supports the vehicle seat, the nut member 83 is fixed to the lower rail 81, the screw shaft 84 is screwed together with the nut member 83, and the gear box 85 is fixed to a front end part of the upper rail 82 and transmits the driving force of the electrical drive source to the screw shaft 84.

The gear box 85 includes a gear housing 86 made of resin, a support bracket 87, and a plate 88. The gear housing 86 is sandwiched and held between the support bracket 87 and the plate 88. Further, the gear housing 86 of the gear box 85 houses, therein, a worm 91 and a helical gear (i.e., a worm wheel) 92. The worm 91 is provided on the electrical drive source and the helical gear 92 made of resin is fixed to a front edge portion of the screw shaft 84 and engaged with the worm 91.

As illustrated in FIG. 4B, the helical gear 92 is fixed to the screw shaft 84 in such a manner that the helical gear 92 is held between a washer 93 and a nut 94. The washer 93 made of metal is engaged with a stepped portion 84b of the screw shaft 84 and the nut 94 is fastened by means of a bolt portion 84a (ref. FIG. 4A) of the screw shaft 84 extending through the gear box 85. The washer 93 prevents the helical gear 92 made of resin from being directly contacted with the stepped portion 84b and deformed at the time of fastening the nut 94. A support bracket 87 is fixed to the upper rail 82 by means of a rivet 95 at plural mount portions 87a (only one mount portion 87a is illustrated in FIG. 4A) protruded along the upper rail 82 while contacting with a front end surface of the upper rail 82 and the gear box 85.

An end portion of the helical gear 92 contacting with the washer 93 forms a cylindrical shaft portion 92a. The shaft portion 92a of the helical gear 92 is supported by means of a bearing portion 86a of the gear housing 86. More particularly, the screw shaft 84 is rotatably supported about an axis and immovably supported in an axial direction by means of the gear box 85 (the gear housing 86) fixed to the upper rail 82 through the helical gear 92.

With the configuration of the disclosed power seat slide apparatus for the vehicle, in a condition where the screw shaft 84 provided with the helical gear 92 is rotated by rotary activating the worm 91 by means of the electrical drive source, the screw shaft 84 moves in the axial direction relative to the nut member 83 fixed to the lower rail 81. In consequence, the upper rail 82 slides relative to the lower rail 81, and the position of the vehicle seat relative to the vehicle floor is adjusted.

However, with the configuration of the disclosed power seat slide apparatus for the vehicle, with reference to FIGS. 4A-4B, an insert hole 87b of the support bracket 87, to which a front end portion of the screw shaft 84 is idly inserted, and the washer 93 in the axial direction are arranged in overlapped manner. More particularly, a part of an inner wall surface of the insert hole 87b is overlapped with the washer 93 in an outer diameter direction of the washer 93. Therefore, in a condition where the screw shaft 84 rotates with the washer 93, when the washer 93 and the insert hole 87b are interfered with each other, a sound caused by a contact between metals may be generated.

Further, in a condition where the insert hole 87b is configured with a larger inner diameter in order to prevent an interference between the insert hole 87b and the washer 93, a sufficient thickness of the support bracket 87 cannot be ensured as illustrated in FIG. 5. In consequence, the support bracket 87 may lack appropriate strength.

A need thus exists to provide a power seat slide apparatus for a vehicle, which ensures an appropriate strength thereof while restricting a sound.

SUMMARY OF THE INVENTION

According to an aspect of the present invention, a power seat slide apparatus for a vehicle includes a first rail adapted to be fixed to a vehicle floor, a second rail adapted to be fixed to a vehicle seat and slidably supported relative to the first rail, a screw shaft screwed into a nut member which is fixed to the first rail, the screw shaft including an end portion and a stepped portion, the end portion of the screw shaft being reduced in diameter through the stepped portion, the screw shaft being rotatable relative to the nut member for slidably moving the second rail relative to the first rail, a washer engaged with the stepped portion of the screw shaft, the washer to which the end portion of the screw shaft is inserted, a gear member made of resin to which the end portion of the screw shaft is inserted, a fastening member provided at the end portion of the screw shaft for holding the gear member between the fastening member and the washer, and a gear box fixed to an end of the second rail for transmitting a driving force of an electrical drive source to the screw shaft through the gear member. The gear box includes a support bracket having an insert hole to which the end portion of the screw shaft is inserted, a gear housing having a bearing portion for supporting the gear member at the bearing portion, the gear housing to which the end portion of the screw shaft is inserted, the gear housing having a concave portion for housing the washer with a clearance therein, and a plate for holding the gear housing between the plate and the support bracket, the plate to which the end portion of the screw shaft is inserted. The stepped portion of the screw shaft is arranged in such a manner that the washer is connected thereto in the gear housing.

According to another aspect of the present invention, a power seat slide apparatus for a vehicle includes a first rail adapted to be fixed to a vehicle floor, a second rail adapted to be fixed to a vehicle seat and slidably supported relative to the first rail, a screw shaft screwed into a nut member which is provided at the first rail, the screw shaft including a stepped portion and a diameter contracted portion which is reduced in diameter through the stepped portion, the screw shaft being rotatable relative to the nut member for slidably moving the second rail relative to the first rail, a washer engaged with the stepped portion of the screw shaft, the washer to which the diameter contracted portion of the screw shaft is inserted, a gear member to which the diameter contracted portion is inserted, a fastening member provided at the diameter contracted portion for holding the gear member between the fastening member and the washer, and a gear box provided at the second rail for transmitting a driving force of a drive source to the screw shaft through the gear member. The gear box includes a support bracket having an insert hole to which the diameter contracted portion is inserted, a gear housing having a bearing portion for supporting the gear member at the bearing portion, the gear housing to which the diameter contracted portion is inserted, and a plate for holding the gear housing between the plate and the support bracket, the plate to which the diameter contracted portion is inserted. The stepped portion is arranged in such a manner that the washer is connected thereto in the gear housing.

According to still another aspect of the present invention, a power seat slide apparatus for a vehicle includes a first rail adapted to be provided at a vehicle floor, a second rail adapted to be provided at a vehicle seat and slidably supported relative to the first rail, a screw shaft screwed to a nut member provided at the first rail, the screw shaft being rotatable relative to the nut member for slidably moving the second rail relative to the first rail, a washer to which the screw shaft is inserted, a gear member to which the screw shaft is inserted, and a gear box provided at the second rail for transmitting a driving force of a drive source to the screw shaft through the gear member, the gear box including a support bracket having an insert hole to which the screw shaft is inserted. The washer and the support bracket are mutually arranged as being shifted in an axial direction of the screw shaft.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention will be explained hereinbelow with reference to the attached drawings. According to the embodiment of the present invention, a power seat slide apparatus for a vehicle is mounted to a front seat side of the vehicle such as an automobile, or the like. Further, directions of backward and forward, right and left, and up and down described in the specification are based on the directions of a vehicle seat.

Figure 1:
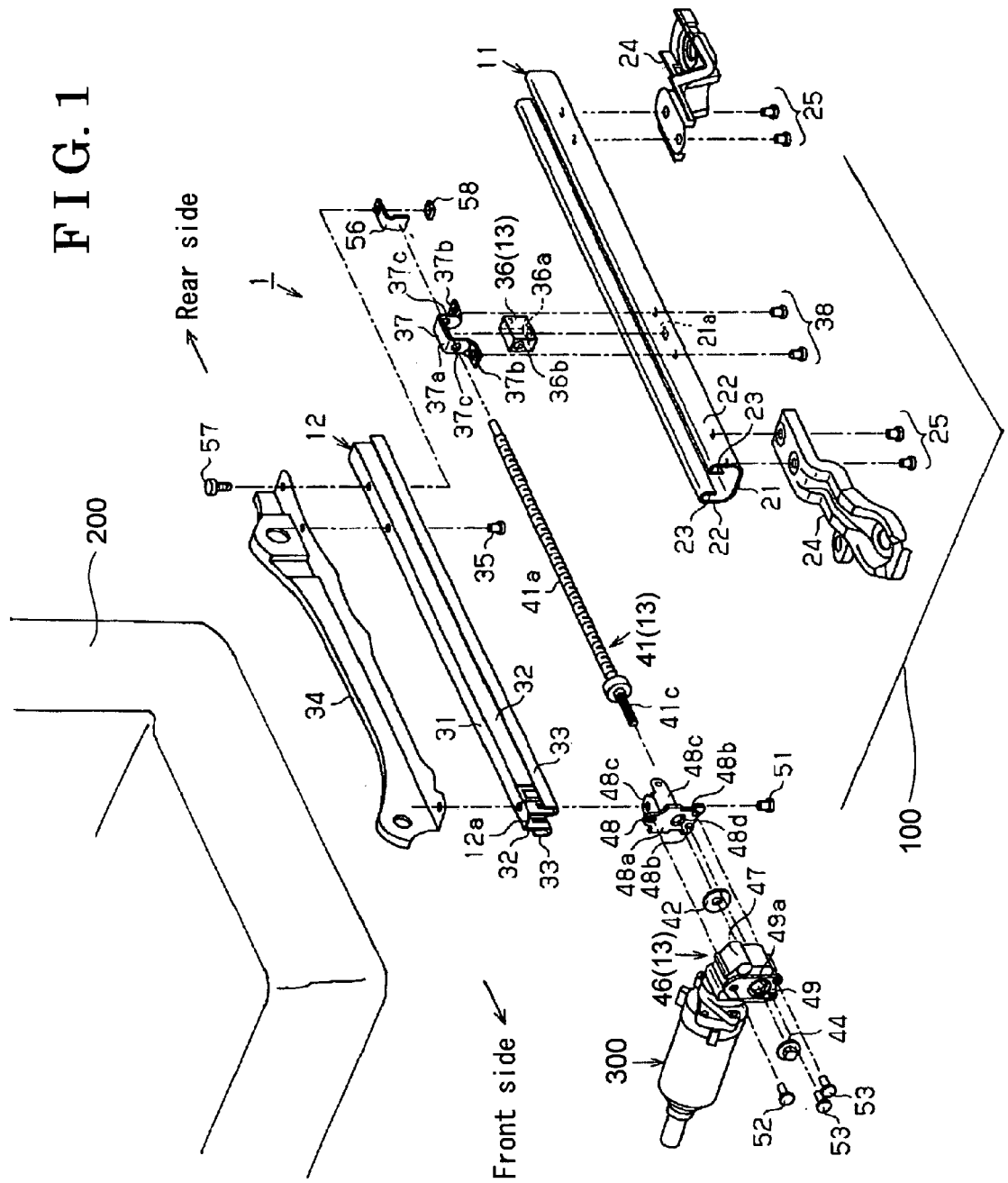
FIG. 1 is an exploded perspective view of a power seat slide apparatus for a vehicle according to an embodiment of the present invention.
Figure 2:
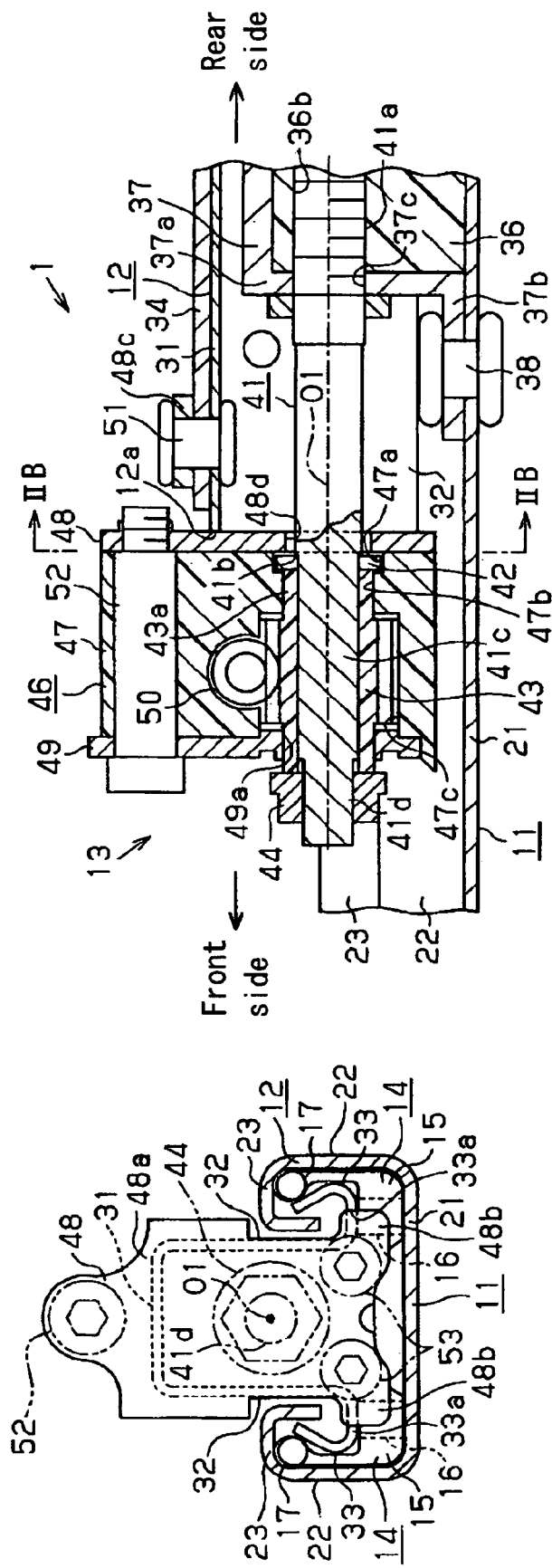
FIG. 2A is a longitudinal sectional view of the power seat slide apparatus for the vehicle according to the embodiment of the present invention.
FIG. 2B is a sectional view taken along line IIB-IIB of FIG. 2A.
Figure 3:
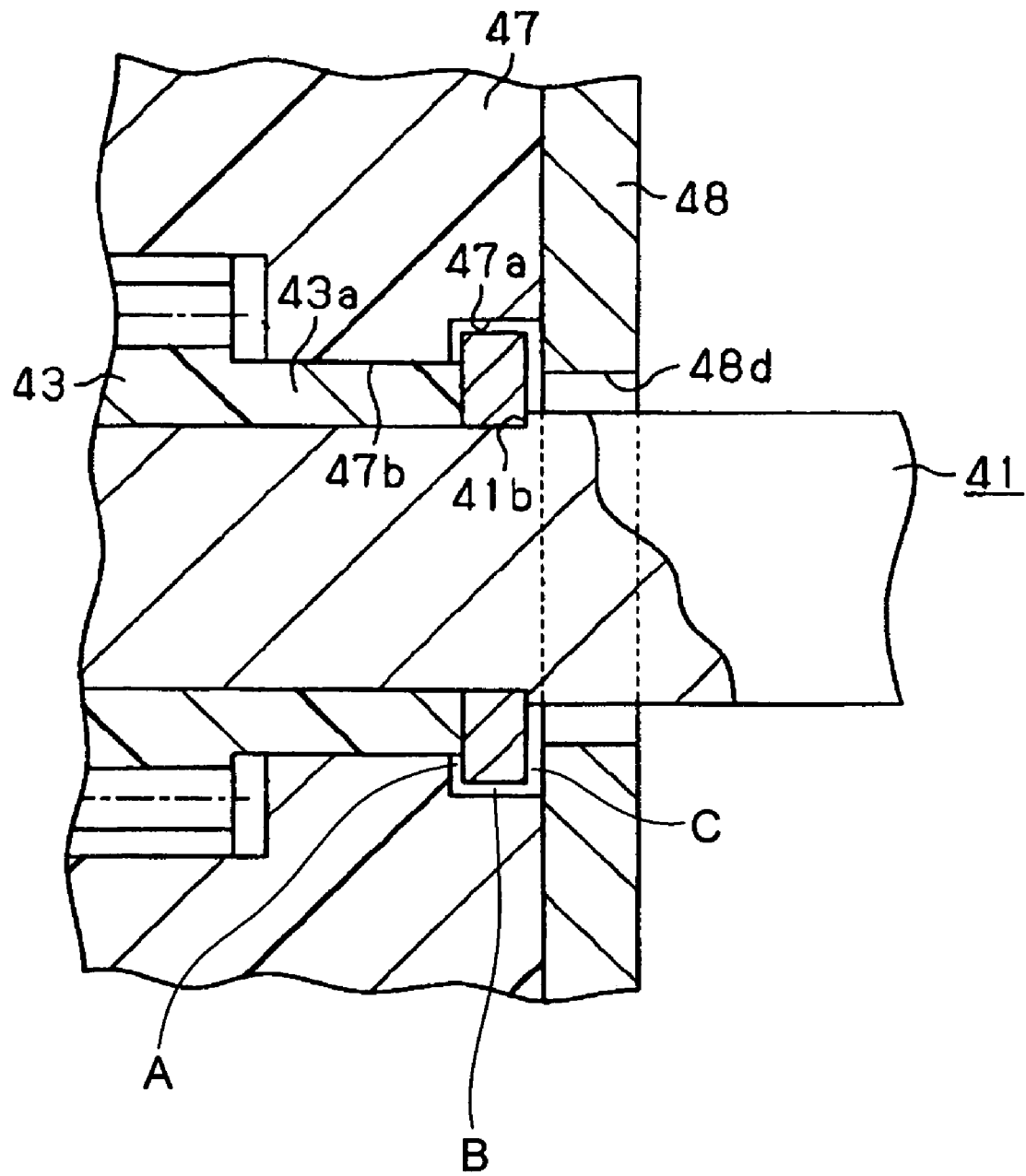
FIG. 3 is an enlarged partial view of FIG. 2A.
Figure 4A:
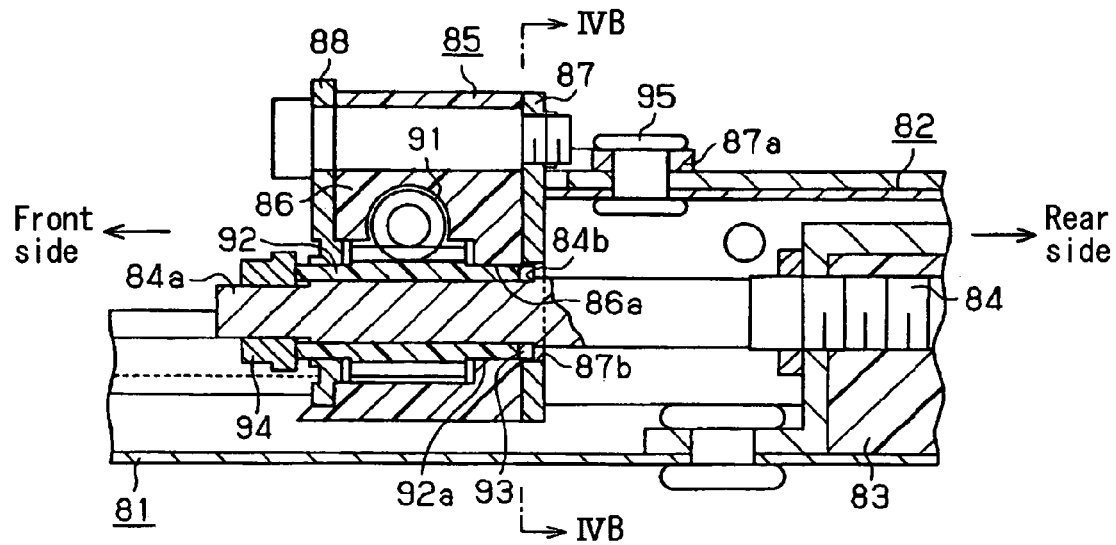
FIG. 4A is a longitudinal sectional view of a power seat slide apparatus for a vehicle according to a related art.
Figure 4B:
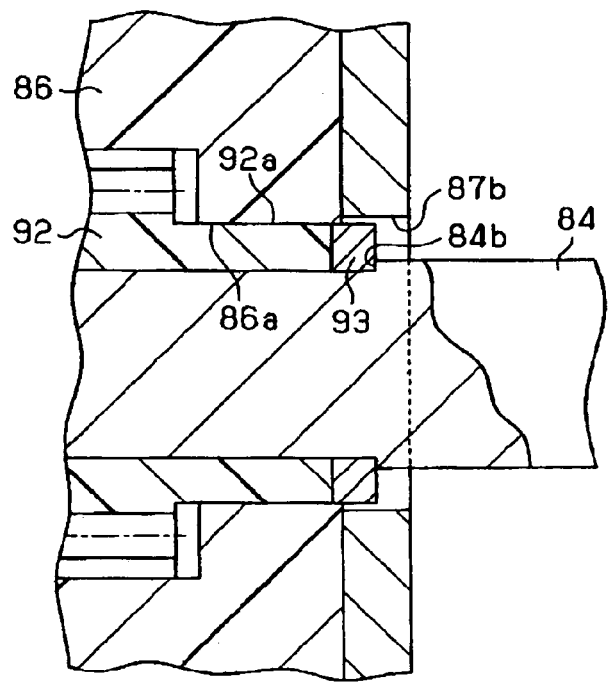
FIG. 4B is an enlarged partial view of FIG. 4A.
Figure 5:
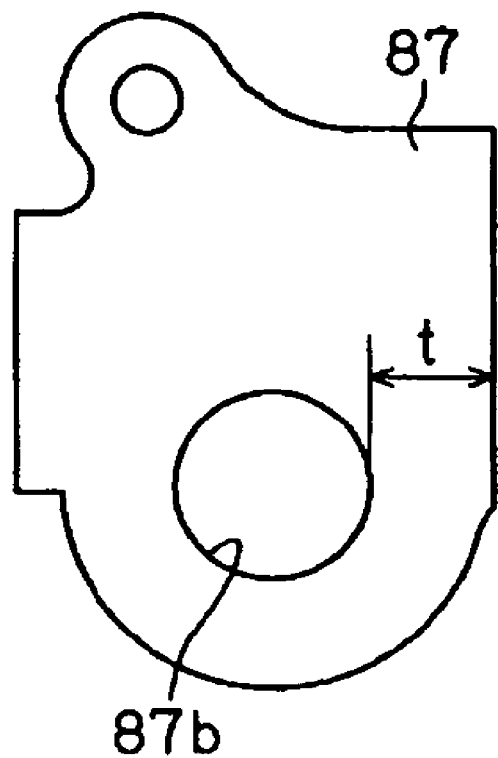
FIG. 5 is a front view of a support bracket of the power seat slide apparatus for the vehicle according to the related art.

As illustrated in FIGS. 1-3, the power seat slide apparatus 1 includes a lower rail 11 serving as a first rail, an upper rail 12 serving as a second rail, and an activate mechanism 13.

The lower rail 11 is formed into a long shape and extends in a backward and forward direction. The lower rail 11 includes a bottom wall portion 21, a pair of first side wall portions 22 extended upward from both sides of the bottom wall portion 21, and a pair of first folded wall portions 23 curved inwardly in a width direction (right and left direction) from each upper end of the first side wall portions 22 and folded toward a base portion of the first side wall portion 22. A first bracket 24 is respectively assembled to both ends portion of the lower rail 11 in the backward and forward direction by means of a first rivet 25 at the bottom wall portion 21 of the lower rail 11. The lower rail 11 is fixed to a vehicle floor 100 through the first bracket 24.

The upper rail 12 is formed into a long shape and extends in the backward and forward direction. The upper rail 12 includes a top wall portion 31, a pair of second side wall portions 32 extended downward from both sides of the top wall portion 31, and a pair of second folded wall portions 33 curved outwardly in the width direction from each bottom end of the second side wall portions 32 and folded in such a manner to be located between the first side wall portion 22 and the first folded wall portion 23. A second bracket 34 is assembled to the upper rail 12 at the top wall portion 31 by means of a second rivet 35. The upper rail 12 is fixed to a vehicle seat 200 through the second bracket 34.

As illustrated in FIG. 2B, the upper rail 12 is slidably supported by the lower rail 11 through a pair of slide members 14, each of the pair of slide members 14 is housed in a space between each inner wall surface of the lower rail 11 in the width direction and each outer wall surface of the upper rail 12 facing the inner wall surface of the lower rail 11. The slide member 14 includes holders 15 made of resin, or the like, having outer wall surface formed in response to the inner wall surface of the lower rail 11. Plural substantially column shaped rollers 16 are rotatably supported by the holder 15 in such a manner to be located between an upper surface of the bottom wall portion 21 of the lower rail 11 and a bottom surface of the base portion 33a of the second folded wall portion 33 of the upper rail 12. Further, plural balls 17 are rotatably supported by the holder 15 in such a manner to be located between an inner wall surface of the first folded wall portion 23 of the lower rail 11 and a surface of the second folded wall portion 33 of the upper rail 12 facing the first folded wall portion 23. The upper rail 12 is slidably supported by the lower rail 11 upon a guidance of each holder 15 along an inner surface of the lower rail 11 while rotating the roller 16 and the ball 17 between the upper rail 12 and the lower rail 11.

The activate mechanism 13 mainly includes a nut member 36, a screw shaft 41, and a gear box 46. The nut member 36 is fixed to the bottom wall portion 21 of the lower rail 11 together with a third bracket 37 by means of third rivets 38. More particularly, the substantially rectangular nut member 36 includes a convex portion 36a at a surface facing the lower rail 11. The bottom wall portion 21 of the lower rail 11 is formed with an engage hole 21a with which the convex portion 36a of the nut member 36 is engaged. The third bracket 37 includes an engage wall 37a which is formed into a substantially U-shape and is engaged with the nut member 36, and flange portions 37b which are extended from both ends of the engage wall 37a in the backward and forward direction.

The nut member 36 is positioned and supported at the lower rail 11 by engaging the convex portion 36a of the nut member 36 with the engage hole 21a. Further, the nut member 36 is fixed to the lower rail 11 by assembling each flange portion 37b of the third bracket 37 relative to the lower rail 11 by means of the third rivets 38.

The nut member 36 includes a first screw portion (i.e., a female screw) 36b penetrating through the nut member 36 in the backward and forward direction. Further, the engage wall 37a of the third bracket 37 is formed with, at anterior and posterior walls thereof, through holes 37c which are coaxially arranged with the first screw portion 36b of the nut member 36.

The screw shaft 41 extends over almost entire length of the upper rail 12 along a longitudinal direction of the upper rail 12. The screw shaft 41 includes a second screw portion (i.e., male screw) 41a which is screwed into the first screw portion 36b of the nut member 36 by loosely inserting through the third bracket 37 (the through hole 37c). As illustrated in FIGS. 2A-2B, the screw shaft 41 includes an axial center O1 extending along the longitudinal direction of the upper rail 12 between the second side wall portions 32 at middle height thereof. Further a front end portion of the screw shaft 41 is protruded from a front end 12a of the upper rail 12.

With reference to FIGS. 2A-2B, the screw shaft 41 is formed with, at a front end portion (top end portion) thereof, a serrated shaft portion 41c (i.e., a diameter contracted portion) which is reduced in diameter through a stepped portion 41b (engaging portion), and a bolt portion 41d provided at a front end of the serrated shaft portion 41c. In other words, there is a stepped portion 41b between the second screw portion 41a and the serrated shaft portion 41c in the screw shaft 41. The diameter of the serrated shaft portion 41c is shorter than that of the stepped portion 41b. The front end portion of the screw shaft 41 is inserted through a washer 42 made of metal, or the like, and a helical gear (i.e., a worm wheel) 43 serving as a gear member made of resin, or the like, with which the serrated shaft portion 41c of the screw shaft 41 is serration-engaged. Alternatively, or in addition, the front end portion of the screw shaft 41 and the helical gear 43 may be spline-engaged. The helical gear 43 is held between the washer 42 (ref. FIG. 3) engaged with the stepped portion 41b and a first nut 44 (i.e., a fastening member) fastened relative to the bolt portion 41d of the screw shaft 41. Accordingly a position of the helical gear 43 in an axial direction is defined.

An end portion of the helical gear 43 which is contacted with the washer 42 is formed with a substantially cylindrical shaft portion 43a. The washer 42 includes an outer diameter larger than that of the shaft portion 43a in order to contact with an entire surface of the helical gear 43 (the shaft portion 43b) in the axial direction.

According to the embodiment of the present invention, the gear box 46 is fixed to the front end 12a of the upper rail 12. Alternatively, or in addition, the gear box 46 may be fixed to a rear end of the upper rail 12. The gear box 46 includes a gear housing 47 made of resin, or the like, a support bracket 48 made of metal plate, or the like, and the plate 49. The gear housing 47 is held between the support bracket 48 and the plate 49. The gear box 46 houses, therein, the helical gear 43 and a worm 50 engaged with the helical gear 43. The worm 50 is provided at an electrical motor 300 serving as the electrical drive source. The worm 50 and the helical gear 43 together form a reducer. Accordingly, a driving force of the electrical motor 300 is transmitted to the screw shaft 41 through the helical gear 43 in the gear box 46. However the configuration for transmitting the driving force to the screw shaft 41 from the electrical motor 300 is not limited to the worm 50 and the helical gear 43, both of which form the reducer. Alternatively, or in addition, a gear member may be adopted instead of the helical gear 43 in response to the configuration of a driving force transmission.

As illustrated in FIG. 2B, the support bracket 48 includes a main body portion 48a and an extension portion 48b both of which are contacted with a front end surface of the upper rail 12 without interfered with the lower rail 11.

With reference to FIG. 1, the support bracket 48 includes plural mount portions 48c protruded from the main body portion 48a along the upper rail 12, and a first insert hole 48d (i.e., an insert hole) through which the screw shaft 41 is loosely inserted. According to the embodiment of the present invention, the support bracket 48 includes two mount portions 48c. The support bracket 48 is contacted with the front end surface of the upper rail 12 (the top wall portion 31, the second side wall portions 32, and the base portion 33a of the second folded wall portion 33) in such a manner that the front end portion of the screw shaft 41 is inserted through the first insert hole 48d, and is fixed to the upper rail 12 at the mount portions 48c by means of fourth rivets 51. On this occasion, the stepped portion 41b of the screw shaft 41 is arranged in front of the support bracket 48 in the backward and forward direction. Therefore, the washer 42 is positioned in front of the support bracket 48 in the backward and forward direction.

As illustrated in FIGS. 2A and 3, the gear housing 47 includes a first concave portion 47a (i.e., a concave portion) serving as an annular concave portion for housing the washer 42 with a clearance A, B, C therein, a bearing portion 47b for supporting the shaft portion 43a, and a second concave portion 47c for housing the helical gear 43 and the worm 50 therein. The gear housing 47 houses, therein, the washer 42 and the helical gear 43, or the like, and is contacted with a front end surface of the support bracket 48. In the axial direction of the screw shaft 41, there is a clearance A between the washer 42 and the gear housing 47, and there is a clearance C between the washer 42 and the support bracket 48. In the radial direction of the screw shaft 41, there is a clearance B between the washer 42 and the gear housing 47.

The plate 49 is formed with a second insert hole 49a through which the helical gear 43 mounted on the serrated shaft portion 49c is inserted. The plate 49 is contacted with a front end surface of the gear housing 47 in such a manner that the helical gear 43 is inserted through the second insert hole 49a.

The gear housing 47 is located between the support bracket 48 and the plate 49 and is held by means of the support bracket 48 and the plate 49 by fixing a first screw 52 and a pair of second screws 53 (ref. FIG. 1), which are penetrating through the plate 49 and the gear housing 47, relative to the support bracket 48. On this occasion, the shaft portion 43a of the helical gear 43 mounted on the screw shaft 41 (the serrated shaft portion 41c) is supported by means of the bearing portion 47b of the gear housing 47. More particularly, the screw shaft 41 is rotatably supported about an axis and immovably supported in the axial direction by means of the gear box 46 (the gear housing 47) fixed at the front end of the upper rail 12.

According to the embodiment of the present invention, the support bracket 48 is fixed to the front end 12a of the upper rail 12, then the washer 42 is assembled to the screw shaft 41 (serrated shaft portion 41c), and then the gear housing 47 is assembled. It is because the first insert hole 48d includes an inner diameter which is smaller than an outer diameter of the washer 42 in order to prevent lowering of strength of the support bracket 48. The helical gear 43 is inserted through the second insert hole 49a of the plate 49 through the second concave portion 47c in accordance with an assembling of the gear housing 47, or the like. Thereafter, the first nut 44 is fastened relative to the bolt portion 41d and the helical gear 43 is thereby held between the first nut 44 and the washer 42.

As illustrated in FIG. 1, the third bracket 37 for fixing the nut member 36 to the lower rail 11 is provided with, at a rear side thereof, a substantially L-shaped stopper 56 made of metal, or the like. The stopper 56 is fastened and fixed to the upper rail 12 by means of a bolt 57 and a second nut 58.

With the configuration of the power seat slide apparatus 1 according to the embodiment of the present invention, when the screw shaft 41 is rotated through the helical gear 43 because of a rotational activation of the worm 50 by means of the electrical motor 300, the screw shaft 41 moves in the axial direction relative to the nut member 36 fixed at the lower rail 11. Accordingly, the upper rail 12 slides relative to the lower rail 11. In consequence, a position of the vehicle seat can be adjusted. In contrast, when a rotation of the screw shaft 41 is stopped, an axial movement of the screw shaft 41 is restricted because of a screw engagement with the nut member 36. Accordingly, a slide movement of the upper rail 12 relative to the lower rail 11 is restricted and the vehicle seat is held at a predetermined position.

According to the embodiment of the present invention, the washer 42 engaged with the stepped portion 41b is located between the stepped portion 41b and the helical gear 43 and is defined its position in the axial direction. The stepped portion 41b is arranged in such a manner that the washer 42 is connected thereto in the gear housing 47. More particularly, the first insert hole 48d of the support bracket 48 and the washer 42 are mutually arranged as being shifted in the axial direction. In other words, the support bracket 48 and the washer 42 are respectively arranged at the different positions in the axial direction of the screw shaft 41 so that they do not overlap in the radial direction of the screw shaft 41. Therefore, when the washer 42 rotes together with the screw shaft 41, an interference between the washer 42 and the first insert hole 48d can be restricted, and a generation of a sound caused by contact between metals, or the like, can be restricted. Further, the inner diameter of the first insert hole 48d is not required to define in response to the outer diameter of the washer 42. Moreover, the present invention is applicable as long as the first insert hole 48d includes the inner diameter through which the front end portion of the screw shaft 41 can be inserted. Therefore, an appropriate strength of the support bracket 48 can be ensured.

According to the embodiment of the present invention, the gear housing 47 includes the first concave portion 47a housing the washer 42 with the clearance therein. Therefore, the gear housing 47 is not required to extend in the axial direction in order to ensure a space for the washer 42, and the washer 42 can be housed in the gear housing 47 within an existing length thereof in the axial direction. Accordingly, an enlargement of the gear housing 47 (the gear box 46) in the axial direction can be prevented. Moreover, because the helical gear 43 can maintain an existing bearing diameter (an inner diameter of the bearing portion 47b) without influenced by the outer diameter of the washer 42, a load for changing a design can be reduced.

According to the embodiment of the present invention, with reference to FIG. 2A, the bearing portion 47b is arranged between the first concave portion 47a and the second concave portion 47c. However, the present invention is not limited thereto. Alternatively, or in addition, the bearing portion 47b for supporting the helical gear 43 may be formed and arranged opposed to the first concave portion 47a across the second concave portion 47c.

Alternatively, or in addition, a moving direction of the vehicle seat in response to a sliding movement of the upper rail 12 relative to the lower rail 11 may be the backward and forward direction of the vehicle or a width direction of the vehicle.

According to the embodiment of the present invention, the power seat slide apparatus for the vehicle can ensure an appropriate strength thereof while restricting the sound.

The principles, preferred embodiment and mode of operation of the present invention have been described in the foregoing specification. However, the invention which is intended to be protected is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A power seat slide apparatus for a vehicle comprising:
a first rail adapted to be fixed to a vehicle floor;
a second rail adapted to be fixed to a vehicle seat and slidably supported relative to the first rail;
a screw shaft screwed to a nut member which is fixed to the first rail, the screw shaft including an end portion and a stepped portion, the end portion of the screw shaft being reduced in diameter through the stepped portion, the screw shaft being rotatable relative to the nut member for slidably moving the second rail relative to the first rail;
a washer engaged with the stepped portion of the screw shaft, the washer to which the end portion of the screw shaft is inserted;
a gear member made of resin to which the end portion of the screw shaft is inserted;
a fastening member provided at the end portion of the screw shaft for holding the gear member between the fastening member and the washer; and
a gear box fixed to an end of the second rail for transmitting a driving force of an electrical drive source to the screw shaft through the gear member;
the gear box including:
a support bracket having an insert hole to which the end portion of the screw shaft is inserted;
a gear housing having a bearing portion for supporting the gear member at the bearing portion, the gear housing to which the end portion of the screw shaft is inserted, the gear housing having a concave portion for housing the washer with a clearance therein; and
a plate for holding the gear housing between the plate and the support bracket, the plate to which the end portion of the screw shaft is inserted, wherein
the stepped portion of the screw shaft is arranged in such a manner that the washer is engaged with the stepped portion in the gear housing.

2. The power seat slide apparatus for a vehicle according to claim 1, wherein the stepped portion is arranged in the side of the gear housing beyond the support bracket in an axial direction of the screw shaft.

3. A power seat slide apparatus for a vehicle comprising:
a first rail adapted to be provided at a vehicle floor;
a second rail adapted to be provided at a vehicle seat and slidably supported relative to the first rail;
a screw shaft screwed to a nut member provided at the first rail, the screw shaft being rotatable relative to the nut member for slidably moving the second rail relative to the first rail;
a washer to which the screw shaft is inserted;
a gear member to which the screw shaft is inserted; and
a gear box provided at the second rail for transmitting a driving force of a drive source to the screw shaft through the gear member, the gear box including a support bracket having an insert hole to which the screw shaft is inserted and a concave portion for housing the washer with a clearance therein, wherein the washer and the support bracket are mutually arranged as being shifted in an axial direction of the screw shaft.

* * * * *

UNITED STATES PATENT AND TRADEMARK OFFICE
CERTIFICATE OF CORRECTION

| | | |
|---|---|---|
| PATENT NO. | : 7,641,164 B2 | Page 1 of 1 |
| APPLICATION NO. | : 11/402797 | |
| DATED | : January 5, 2010 | |
| INVENTOR(S) | : Yoshitaka Nakamura | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 244 days.

Signed and Sealed this

Twenty-first Day of December, 2010

David J. Kappos
*Director of the United States Patent and Trademark Office*